United States Patent
Yuan

(10) Patent No.: US 12,523,283 B2
(45) Date of Patent: Jan. 13, 2026

(54) DISC SPROCKETS, DISC SPROCKET SYSTEMS, AND METHODS FOR ASSEMBLING THE SAME

(71) Applicant: Gates Corporation, Denver, CO (US)

(72) Inventor: Jing Yuan, Rochester Hills, MI (US)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 18/741,736

(22) Filed: Jun. 12, 2024

(65) Prior Publication Data
US 2025/0155010 A1  May 15, 2025

Related U.S. Application Data

(62) Division of application No. 18/060,537, filed on Nov. 30, 2022, now Pat. No. 12,031,619.

(60) Provisional application No. 63/284,442, filed on Nov. 30, 2021.

(51) Int. Cl.
*F16H 55/17* (2006.01)

(52) U.S. Cl.
CPC .................... *F16H 55/171* (2013.01)

(58) Field of Classification Search
CPC ......... F16H 55/171; F16H 55/12; F16H 55/30
USPC ....................................................... 474/152
See application file for complete search history.

(56) References Cited

U.S. PATENT DOCUMENTS

| | | | | |
|---|---|---|---|---|
| 1,181,175 A | * | 5/1916 | Shapiro | F16H 7/18 474/151 |
| 1,201,748 A | * | 10/1916 | Luce | F16H 55/30 474/163 |
| 1,247,922 A | * | 11/1917 | Battle | F16H 55/17 74/445 |
| 1,456,700 A | * | 5/1923 | Luhr | B23B 39/20 74/461 |
| 1,466,236 A | * | 8/1923 | Stanley | F16H 55/06 74/445 |
| 1,520,625 A | * | 12/1924 | Wigley | F16H 55/12 29/893 |
| 1,662,026 A | * | 3/1928 | Brophy | B23P 15/14 29/DIG. 26 |
| 1,835,406 A | * | 12/1931 | Kirsten | F16H 7/06 474/230 |
| 1,852,957 A | * | 4/1932 | Dalton | F16H 55/14 74/445 |
| 2,228,828 A | * | 1/1941 | Imai | F16H 55/06 74/445 |
| 2,362,106 A | * | 11/1944 | Ungar | F04C 2/084 74/460 |
| 2,412,114 A | * | 12/1946 | Zonis | D05B 69/30 474/158 |
| 2,516,365 A | * | 7/1950 | Carraher | F16H 55/06 439/894 |
| 2,709,375 A | * | 5/1955 | Sandberg | F16H 55/12 29/893.33 |
| 3,225,616 A | * | 12/1965 | Whitehead | F16H 55/12 74/448 |
| 3,320,451 A | * | 5/1967 | Wiley | H02K 1/16 29/605 |

(Continued)

*Primary Examiner* — Henry Y Liu
(74) *Attorney, Agent, or Firm* — Kevin J. Aiken, Esq.

(57) ABSTRACT

A sprocket system including a sprocket assembled from multiple disc sprockets coaxially aligned and secured together to provide a desired axial width for the sprocket is described. In some embodiments, the sprocket described herein is a hub-less sprocket.

1 Claim, 6 Drawing Sheets

(56) References Cited

U.S. PATENT DOCUMENTS

| Patent/Pub. No. | | Date | Inventor | Classification |
|---|---|---|---|---|
| 3,650,158 A | * | 3/1972 | Van Huis | A01K 39/01 366/342 |
| 3,988,942 A | * | 11/1976 | Greiner | F16H 55/17 29/893.1 |
| 3,999,445 A | * | 12/1976 | Liautaud | B29C 45/14778 29/893.3 |
| 4,044,621 A | * | 8/1977 | McGregor, Sr. | B62J 13/00 74/609 |
| 4,089,406 A | * | 5/1978 | Teske | B65G 19/16 198/814 |
| 4,240,303 A | * | 12/1980 | Mosley | F16H 57/04 474/151 |
| 4,494,889 A | * | 1/1985 | Thompson | F16D 1/096 403/4 |
| 4,522,080 A | * | 6/1985 | Santi | F16H 53/025 29/893.2 |
| 4,630,498 A | * | 12/1986 | Santi | F16H 55/12 74/567 |
| 4,633,556 A | * | 1/1987 | Santi | F16H 53/025 29/525 |
| 4,719,682 A | * | 1/1988 | Santi | F16H 55/12 29/525 |
| 4,867,733 A | * | 9/1989 | Yamanoi | F16H 7/06 474/161 |
| 5,074,406 A | * | 12/1991 | Gundlach | B65G 23/06 198/834 |
| 5,170,883 A | * | 12/1992 | Ledet | B65G 17/08 198/834 |
| 5,181,433 A | * | 1/1993 | Ueno | F16H 55/08 74/409 |
| 5,263,575 A | * | 11/1993 | Ledet | B65G 23/06 198/834 |
| 5,303,477 A | * | 4/1994 | Kuzarov | F16D 1/0817 30/384 |
| 5,316,522 A | * | 5/1994 | Carbone | F16H 55/12 474/903 |
| 5,337,626 A | * | 8/1994 | Everts | F16H 55/12 74/445 |
| 5,417,617 A | * | 5/1995 | Milton | F16H 55/171 474/93 |
| 6,176,797 B1 | * | 1/2001 | Vine | F16D 1/094 474/170 |
| 6,419,061 B1 | * | 7/2002 | Ring | F16D 41/066 192/45.004 |
| 6,540,630 B1 | * | 4/2003 | Oertley | F16H 55/30 305/137 |
| 6,899,651 B2 | * | 5/2005 | Oertley | F16H 55/12 305/137 |
| 8,398,512 B2 | * | 3/2013 | Dickinger | F16H 55/38 474/93 |
| 9,360,099 B2 | * | 6/2016 | Wang | F16H 55/171 |
| 9,555,855 B2 | * | 1/2017 | Iwai | B62M 9/105 |
| 9,803,738 B2 | * | 10/2017 | Cowen | F16H 55/30 |
| 2005/0064972 A1 | * | 3/2005 | Rusheidat | F16H 55/171 474/152 |
| 2007/0161443 A1 | * | 7/2007 | Krisl | F16H 55/30 474/95 |
| 2009/0093328 A1 | * | 4/2009 | Dickinger | F16H 55/171 474/152 |
| 2011/0009221 A1 | * | 1/2011 | Ogo | F01L 1/02 474/213 |
| 2012/0094795 A1 | * | 4/2012 | Wang | F16G 5/20 474/205 |
| 2013/0143703 A1 | * | 6/2013 | Schlumpf | F16H 55/171 474/152 |
| 2014/0335987 A1 | * | 11/2014 | Iwai | B62M 9/10 474/152 |
| 2015/0018150 A1 | * | 1/2015 | Cowen | F16H 57/05 474/152 |
| 2015/0133248 A1 | * | 5/2015 | Wang | F16H 55/49 474/152 |
| 2015/0141183 A1 | * | 5/2015 | Cowen | F16H 7/06 474/152 |
| 2018/0274648 A1 | * | 9/2018 | Feuerborn | F16H 55/171 |
| 2019/0277384 A1 | * | 9/2019 | Feuerborn | F16H 55/48 |
| 2020/0292048 A1 | * | 9/2020 | Feuerborn | F16H 55/171 |

* cited by examiner

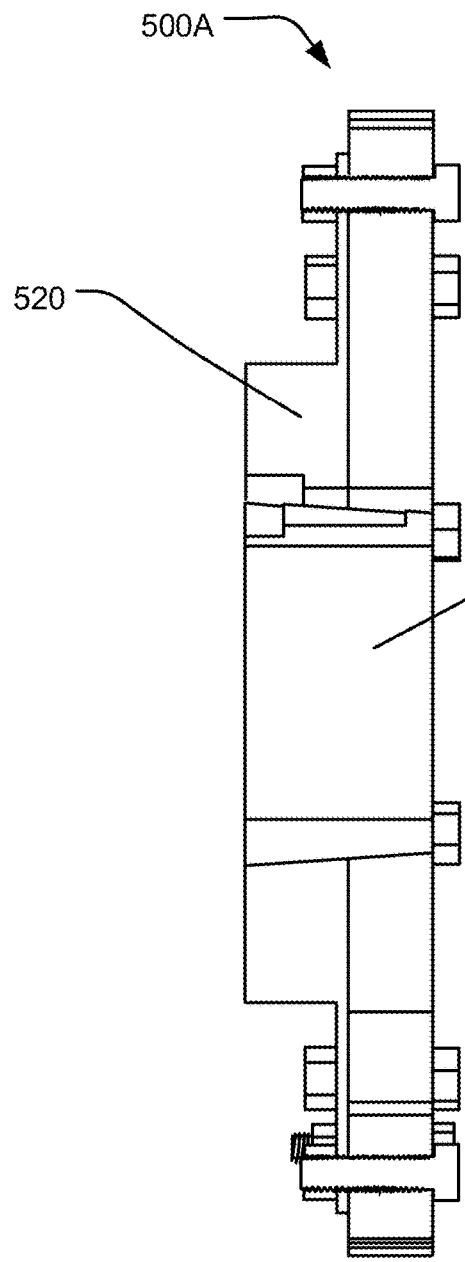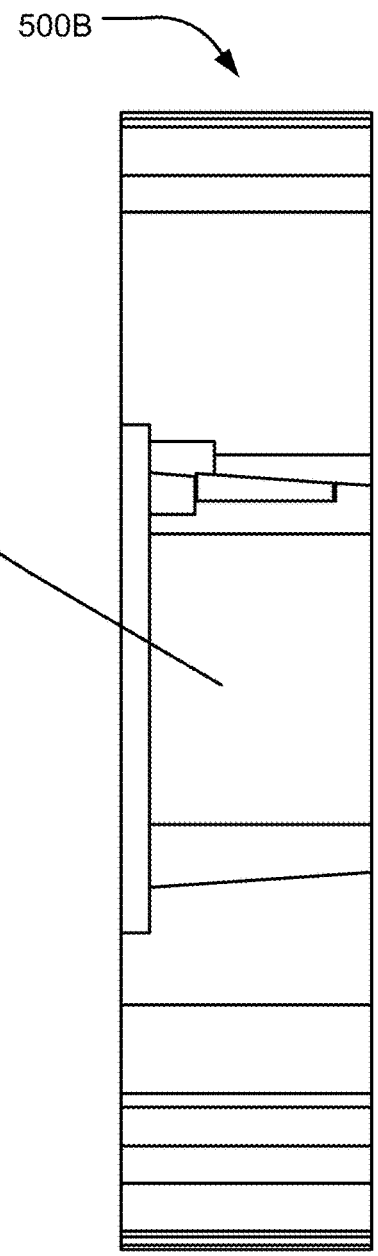
FIG. 5A
FIG. 5B

DISC SPROCKETS, DISC SPROCKET SYSTEMS, AND METHODS FOR ASSEMBLING THE SAME

CROSS-REFERENCE TO RELATED APPLICATIONS

This application claims priority to U.S. Provisional Patent Application Ser. No. 63/284,442, filed Nov. 30, 2021, and titled DISC SPROCKETS, DISC SPROCKET SYSTEMS AND METHODS FOR ASSEMBLING THE SAME, the entire disclosure of which is incorporated herein by reference for all purposes.

TECHNICAL FIELD

The present application relates to disc sprockets, disc sprocket systems, and methods for assembling the same. More specifically, the present application relates to a sprocket assembled from multiple disc sprockets coaxially aligned and secured together to provide a desired axial width for the sprocket. In some embodiments, the sprocket described herein is a hub-less sprocket.

BACKGROUND

Sprockets can be manufactured using various known methods and technologies. In one example, the sprocket formed using a die cast method. In such methods, a mold is used to form the specific shape and dimensions of the sprocket, including the tooth profile for the sprocket. Die cast processes are economical and capable of forming very precise tooth profiles. However, as the width of the sprocket being formed increases, it becomes difficult to eject the sprocket from the mold without creating a drafting angle in the tooth profile. Avoiding the creation of a drafting angle is an important factor to the performance of the sprocket, as the existence of a drafting angle will generally lead to a belt tracking sideways on the sprocket. Accordingly, die cast methods are generally not used in the manufacture of larger width sprockets.

For the manufacture of larger width sprockets, sand casting techniques may be used. In such processes, the sprocket is formed without a tooth profile, and then the tooth profile is created in the "blank" sprocket using various machining techniques. Some examples of techniques that can be used to create the tooth profile in the "blank" sprocket include CNC, tooth shaping, and tooth hobbing. However, these techniques can be expensive, time consuming, and may lead to less precise tooth profile formation.

In view of the above, a need exists for new manufacturing methods and configurations for larger width sprockets that improve the easy of manufacturing, do not have limitations on the width of the sprockets that can be formed, and reduce production costs.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some embodiments, a multi-disc sprocket is described, the multi-disc sprocket including at least two disc sprockets, a first end flange, and a second end flange. The at least two disc sprockets, the first end flange, and the second end flange are coaxially aligned and the at least two disc sprockets are positioned between the first end flange and the second end flange. The at least two disc sprockets have an identical outer diameter and outer diameter tooth profile. The at least two disc sprockets, the first flange and the second flange each have a plurality of fastener openings spaced about their circumference, and the fastener openings may be aligned such that a fastener can be passed therethrough to thereby secure together the at least two disc sprockets, the first flange and the second flange. In some embodiments, the disc sprockets are stamped disc sprockets having a relatively small axial width, such as in the range of less than ⅛ inches. The multi-disc sprocket may also have a hub-less construction.

In some embodiments, a hub-less disc sprocket system is described, the hub-less disc sprocket system including two first disc sprockets and two second disc sprockets. Each of the two first disc sprockets has a first axial width, and each of the second disc sprockets has a second axial width, the second axial width being greater than the first axial width. The first disc sprockets and the second disc sprockets have identical outer diameters and identical outer diameter tooth profiles. When used to construct a hub-less disc sprocket, no more than two of the two first disc sprockets and the two second disc sprockets are coaxially aligned and secured together to form a hub-less disc sprocket.

These and other aspects of the technology described herein will be apparent after consideration of the Detailed Description and Figures herein. It is to be understood, however, that the scope of the claimed subject matter shall be determined by the claims as issued and not by whether given subject matter addresses any or all issues noted in the Background or includes any features or aspects recited in the Summary.

BRIEF DESCRIPTION OF THE DRAWINGS

Non-limiting and non-exhaustive embodiments of the disclosed technology, including the preferred embodiment, are described with reference to the following figures, wherein like reference numerals refer to like parts throughout the various views unless otherwise specified.

FIGS. 5A and 5B are cross-sectional views of a first disc and a second disc sprocket of a hub-less disc sprocket system in accordance with various embodiments described herein.

DETAILED DESCRIPTION

Embodiments are described more fully below with reference to the accompanying Figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 1:
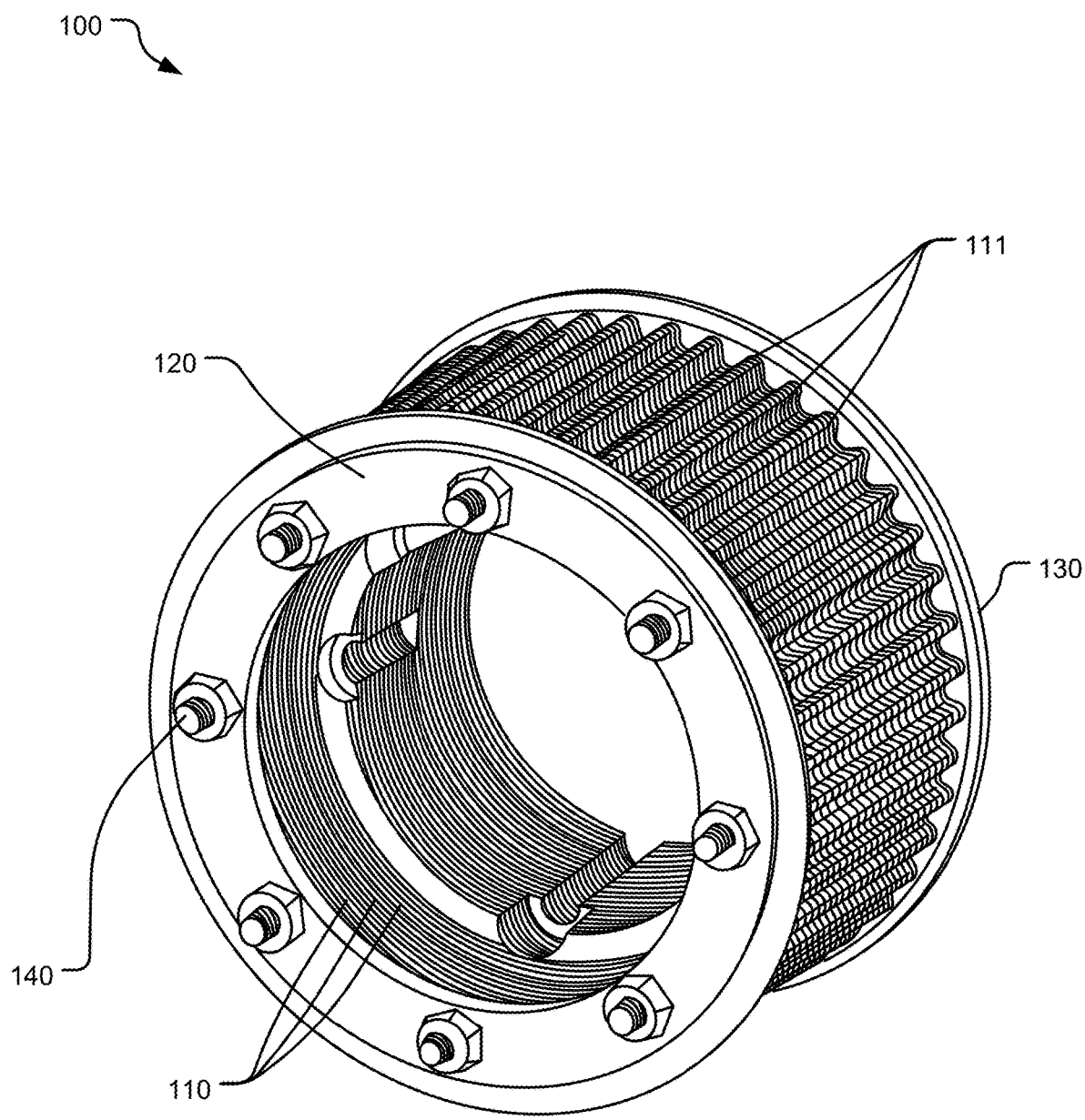
FIG. 1 is a perspective view of a multi-disc sprocket configured in accordance with various embodiments described herein.
Figure 2:
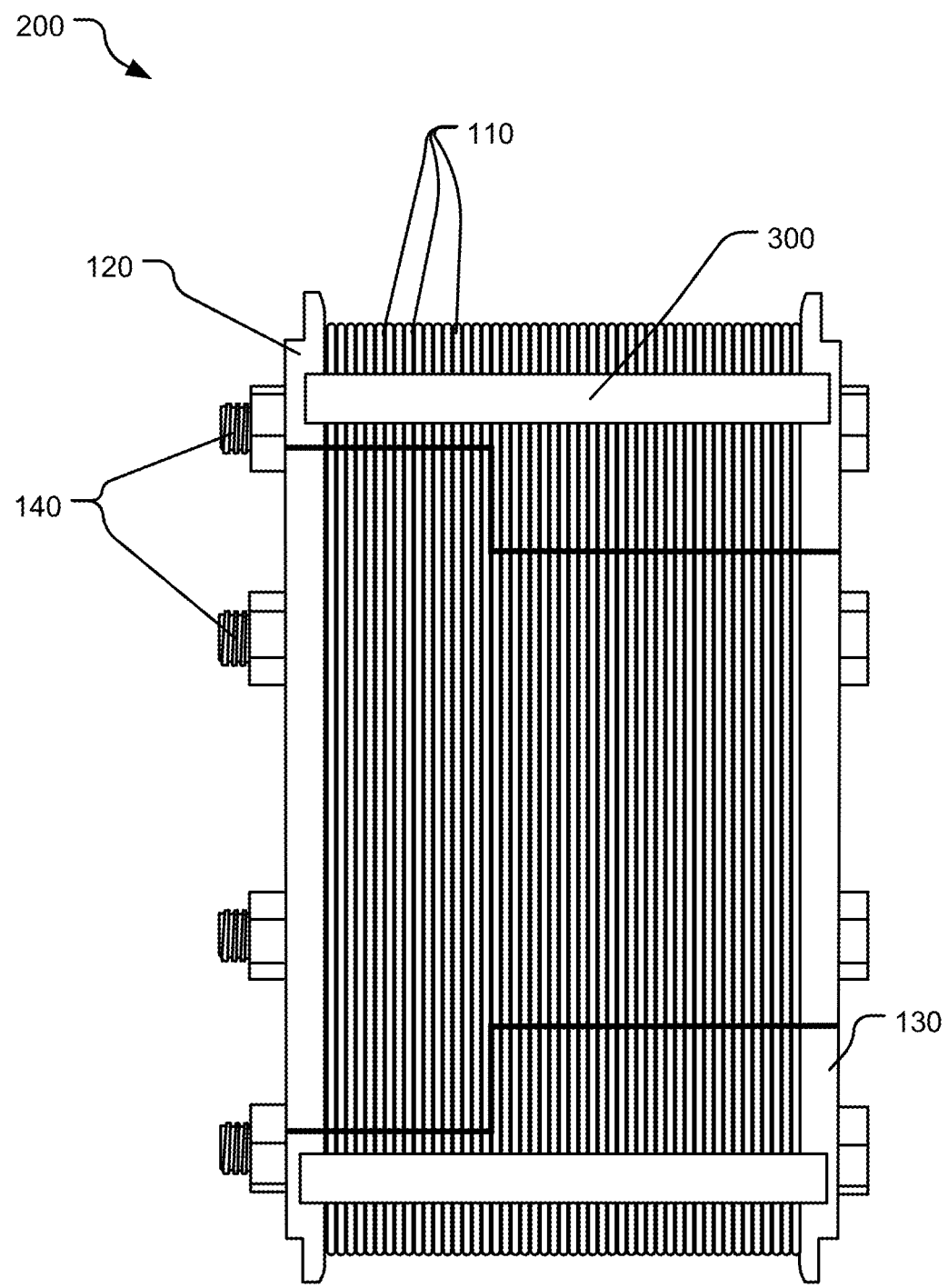
FIG. 2 is a cross-sectional view of a multi-disc sprocket configured in accordance with various embodiments described herein.

With reference to FIGS. 1 and 2, a multi-disc sprocket 100 is shown, the multi-disc sprocket 100 generally including a plurality of individual disc sprockets 110 sandwiched between and coaxially aligned with a first end flange 120 and a second end flange 130. A plurality of fasteners 112 extend through the first end flange 120, the plurality of individual disc sprockets 110, and the second end flange 130 to thereby secure together these components of the overall multi-disc sprocket 100.

As shown in FIGS. 1 and 2, each disc sprocket 110 has a generally annular shape, including an inner diameter and an outer diameter. At the outer diameter, each disc sprocket 110 has a tooth profile, i.e., a series of teeth extending radially outwardly and located around the entire circumference of the disc sprocket 110. The outer diameter and outer diameter tooth profile (including the size, shape, spacing and number of teeth) of each of the disc sprockets 110 is identical such that the disc sprockets 110 can be aligned to form a plurality of axially aligned teeth 111 that extend the axial width of the sprocket 100.

Each of the disc sprockets 110 also includes a plurality of fastener openings spaced circumferentially around the disc sprocket 110. The number, spacing and size of these fastener openings can be identical in each disc sprocket 110 such that the fastener openings in each disc sprocket 110 can be axially aligned. When aligned, a fastener 112 can be extended through the fastener openings in each disc sprocket 110 to thereby secure the disc sprockets 110 together. The first end flange 120 and the second end flange 130 can also include fastener openings that may be aligned with the fastener openings in the disc sprockets 110 such that the fasteners 112 can also extend through the first end flange 120 and the second end flange 130 and thus secure the first end flange 120 and the second end flange 130 with the disc sprockets 110. In some embodiments, the fastener openings are formed in the disc sprockets 110 and end flanges 120, 130 after the disc sprockets and end flanges have been stacked together and the tooth profiles of each disc sprocket have been aligned. This can help to ensure that the fastener openings in each component of the sprocket 100 are aligned so as to form an axially straight opening through the width of the sprocket 100, and ensure that the fastener openings are formed in a location that helps to further ensure the tooth profile of the disc sprockets 110 remains aligned.

Each disc sprocket 110 includes an inner diameter, though the dimensions of the inner diameter may vary between each disc sprocket 110. As shown in FIGS. 1 and 2, a first grouping of disc sprockets 110 located proximate the first end flange 120 have a first inner diameter, while a second grouping of disc sprockets 110 located proximate the second end flange 130 have a second inner diameter that is smaller than the first inner diameter. This configuration creates a shelf or lip approximately midway along the inner axial passage of the multi-disc sprocket 100 as defined by the inner diameters of the disc sprockets 110. As described in greater detail below with respect to FIG. 3, this configuration is provided such that the inner axial passage may be further shaped such that a bushing may be received within the inner axial passage.

In some embodiments, each disc sprocket 110 is formed by stamping the disc sprocket 110 out of, e.g., a sheet of metal or other material used for the material of the disc sprocket 110. For example, if the disc sprockets 110 are to be made of aluminum or iron, a sheet of aluminum or iron having the same width as the desired width of the disc sprockets can be provided, and then a plurality of disc sprockets can be stamped out of the sheet of aluminum or iron using a stamp having the desired shape and dimensions of the disc sprockets 110. This stamping technique for the formation of disc sprockets 110 is a fast, efficient and cost-effective method for forming a plurality of disc sprockets 110.

The specific dimensions of the disc sprockets 110, including the inner diameter, the outer diameter, and the width, are generally not limited. Similarly, the specific tooth profile used (including size, shape, spacing and number of teeth) is generally not limited. All of the parameters can be adjusted based on the specific end use application of the sprocket 100. In some embodiments, however, the axial width of each disc sprocket 110 is relatively small such that relatively thin disc sprockets are provided. In some embodiments, the axial width of each disc sprocket 110 is less than ¼ inches, such as less than ⅛ inches. In some embodiments, the axial width of each disc sprocket 110 is about 3/32 inches.

The specific number of disc sprockets 110 used in sprocket 100 is also generally not limited. The specific number of disc sprockets 110 used in sprocket 100 will generally depend on the desired final axial width of the sprocket 100, with more disc sprockets 110 being used to accomplish larger width sprockets 100. In some embodiments, the number of disc sprockets 110 included in sprocket 100 is greater than 10, greater than 20, greater than 30, greater than 40 or greater than 50.

The first end flange 120 and second end flange 130 generally serve as end caps to the sprocket 100 and which sandwich together the plurality of disc sprockets 110 located therebetween. Like disc sprockets 110, the first end flange 120 and the second end flange 130 each have a generally annular shape. As best shown in FIG. 2, the first end flange 120 and second end flange may have an outer diameter that is equal to or greater than the outer diameter of the disc sprockets 110. In some embodiments, the outer diameter of the first end flange 120 and the second end flange 130 may be identical. The axial thickness of the first end flange 120 and second end flange 130 is not limited, though in some embodiments, the axial thickness of the flanges 120, 130 may be larger than the axial thickness of the disc sprockets 110.

As also shown in FIG. 2, the inner diameter of the first end flange 120 is generally similar or identical to the inner diameter of the disc sprockets 110 located closest to the first end flange 120. Similarly, the inner diameter of the second end flange 130 is similar or identical to the inner diameter of the disc sprockets 110 located closest to the second end flange 130. In this configuration, the inner diameter of the first end flange 120 will be larger than the inner diameter of the second end flange 130.

The specific type of fasteners 112 used to secure the components of the sprocket 100 (i.e., first end flange 120, disc sprockets 110, and second end flange 130) is generally not limited. Exemplary fastener types suitable for use in the embodiments described herein include, but are not limited to, bolts, screws, and rivets. In some embodiments, threaded bolts are used. In such embodiments, the threaded bolts include a head at one end, the diameter of the head being larger than the fastener openings. The threaded bolts are also longer than the axial width of the sprocket 100 such that an end of the threaded bolt opposite the head extends out of the sprocket 100. A nut can then be threaded on the end of the threaded bolt to thereby tighten and secure together the components of the sprocket 100. Regardless of the specific type of fastener used, any number of fasteners can be used to secure together the components of the sprocket 100.

Figure 3:
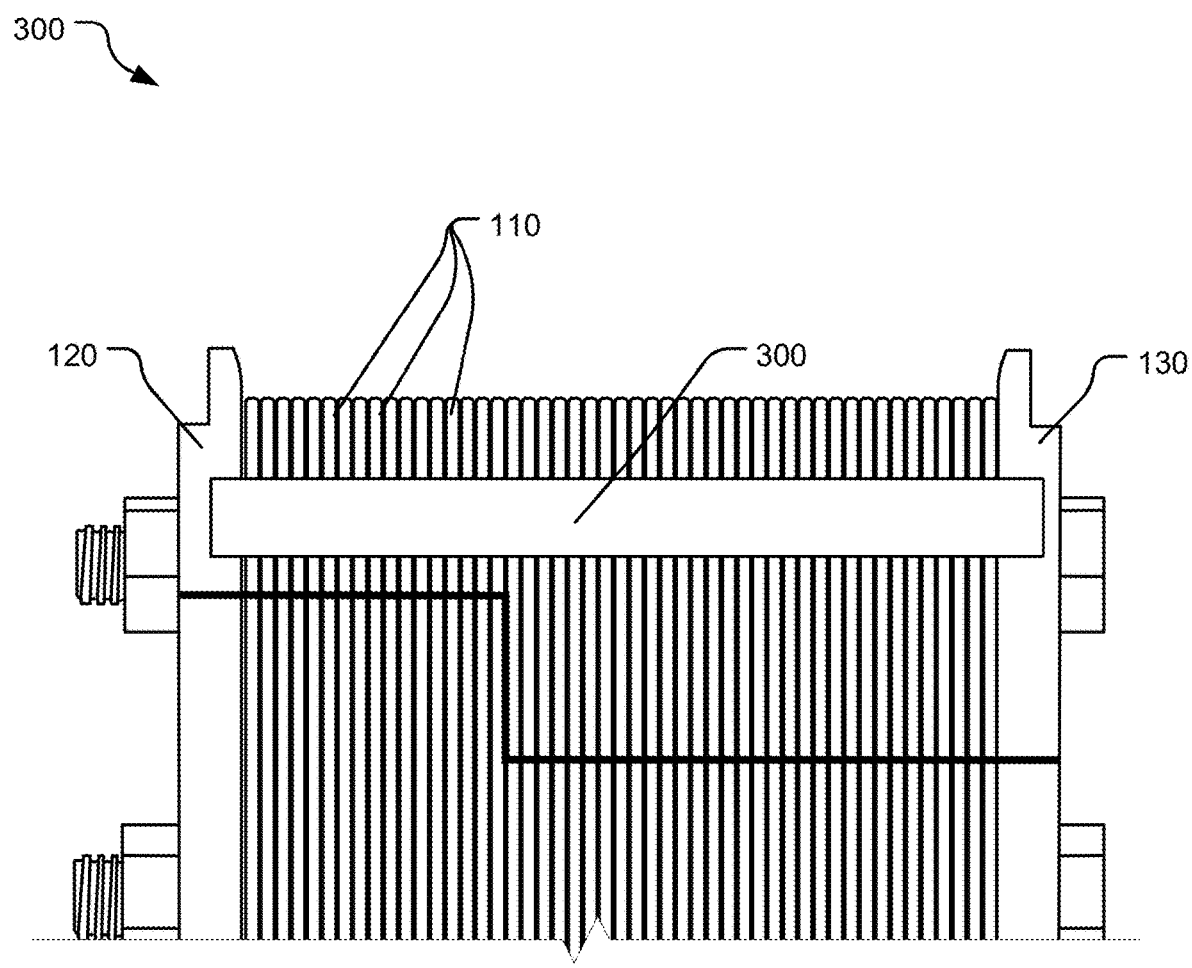
FIG. 3 is a cross-sectional view of a portion of a multi-disc sprocket configured in accordance with various embodiment described herein.

With reference to FIGS. 2 and 3, the sprocket 100 may further include one or more dwell pins 300. Dwell pins 300 can generally be used to, for example, further ensure that the tooth profiles of the disc sprockets 110 are and remain aligned. Dwell pins 300 generally extend all the way through each of the disc sprockets 110, such as through the use of aligned dwell pin openings formed in the disc sprockets 110, and extend at least partially into the first end flange 120 and the second end flange 130. As shown in FIG. 3, both first end flange 120 and second end flange 130 include a recess on their interior side, these recesses being aligned with the dwell pin openings in the disc sprockets 110 such that the dwell pins may extend at least partially into the first end flange 120 and second end flange 130. Any number of dwell pins can be used in the embodiments described herein. In some embodiments, shoulder bolts are used instead of dwell pins.

The interior passage of the sprocket 100 can be configured to receive a bushing therein. The bushing is generally used to secure the sprocket 100 to a rotating shaft. Any type of bushing can be used, and the shape and dimensions of the interior passage can be adjusted to accommodate any suitable type of bushing. In some embodiments, the bushing disposed in the interior passage of the sprocket 100 is a taper lock bushing. With reference to FIGS. 2 and 3, an embodiment where the interior passage is machined to receive a taper lock bushing is shown. In FIG. 2, and as described previously, a first portion of the disc sprockets 110 have a first inner diameter and a second portion of the disc sprockets 110 have a second inner diameter that is less than the first inner diameter to thereby create a shelf or lip midway through the interior passage. In FIG. 3, the interior passage has been machined to create a gradually narrowing section of the interior passage from shelf/lip to the axial of the end of sprocket 100 having the smaller diameter. This tapering portion of the interior passage is thus configured to receive a taper lock bushing therein. While related to a different sprocket embodiment described in more detail below, FIGS. 5A-6C illustrate a taper lock bushing disposed in a tapering section of an interior passage of a sprocket.

The multi-disc sprocket 100 illustrated in FIGS. 1-3 and described previously is generally a hub-less multi-disc sprocket. In other words, the sprocket 100 is connected or secured to a shaft via a bushing as described previously. This is contrast to some sprocket configurations which require the sprocket to be connected or secured to a hub, the hub to be secured or connected to a bushing, and the bushing to be secured or connected to the shaft.

Figure 4:
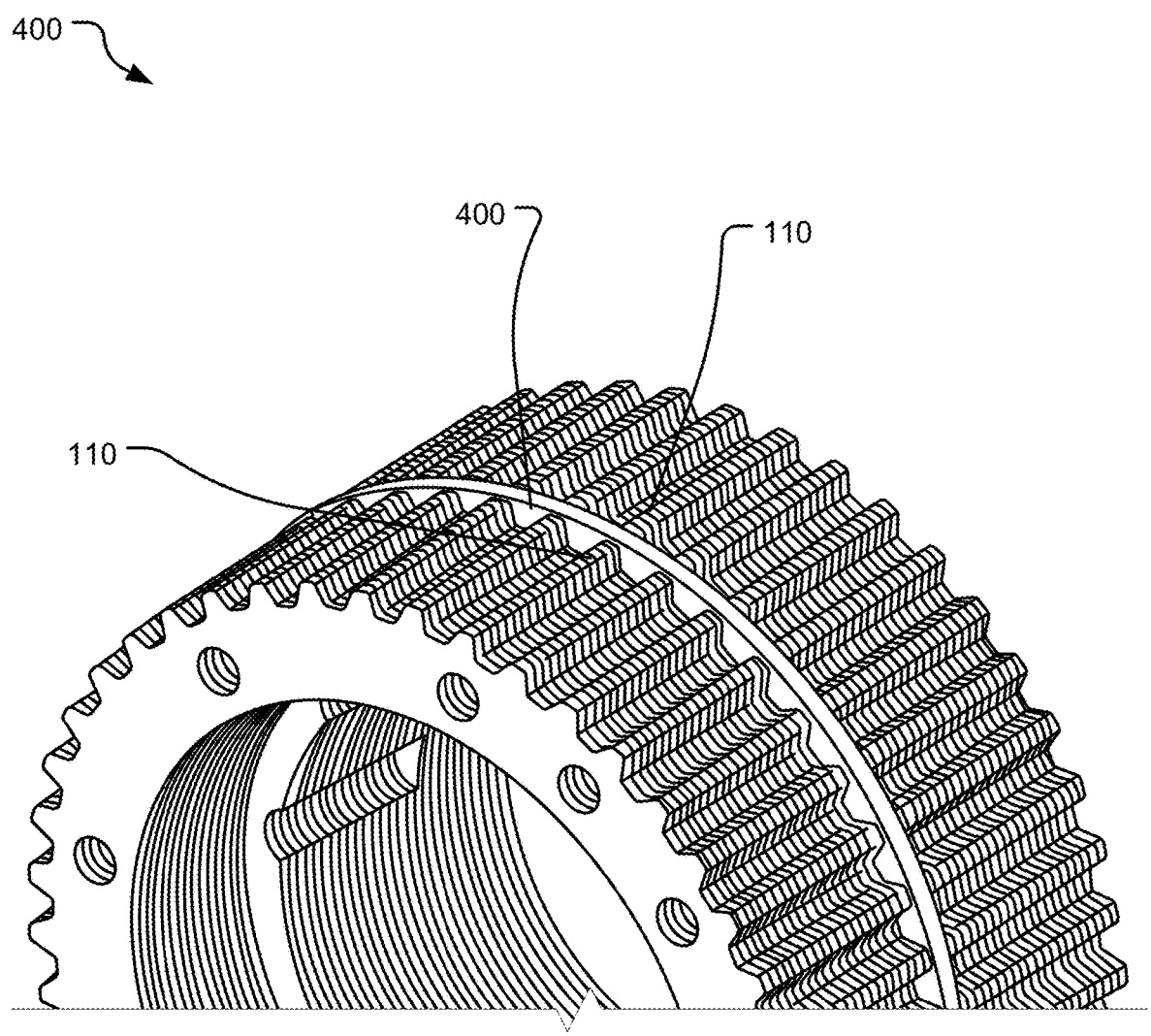
FIG. 4 is a perspective view of a multi-disc sprocket configured in accordance with various embodiments described herein.

With reference now to FIG. 4, in some embodiments, the multi-disc sprocket 100 described herein may further include a center flange 400. Center flanges can be used to help prevent belt tracking. More specifically, the center flange incorporated into the sprocket engages with a recess or channel formed in the belt to thereby prevent lateral movement of the belt.

A center flange 400 may be incorporated into the sprocket 100 by disposing the center flange between two adjacent disc sprockets 110 of the plurality of disc sprockets 110 used to make up most of the width of the sprocket 100. The center flange 400 has an annular shape with an outer diameter and an inner diameter. The inner diameter will generally be size to be similar or identical to the inner diameter of the disc sprockets 110 between which the center flange 400 is disposed. The outer diameter of the center flange 400 is generally similar or identical to the outer diameter of the disc sprockets 110 between which the center flange 400 is disposed, though the outer diameter of the center flange 400 generally does not include a tooth profile. As shown in FIG. 4, the outer diameter of the center flange 400 is generally planar. In some embodiments, the cross-sectional shape of the outer diameter edge of the center flange may be shaped or sized to correspond to the channel or groove formed in the belt.

The specific location of the center flange 400 within the sprocket 100 is generally not limited, though in some embodiments, the center flange 400 will be located at approximately the middle of the width of the sprocket 100.

As described in greater detail previously, the center flange 400 may include one or more fastener openings that align with fastener openings in the disc sprockets 110 and end flanges 120, 130 such that a fastener can extend through the disc sprockets 110, the end flanges 120, 130, and the center flange 400 to thereby secure together all of the components of the sprocket 100.

Figures 6A, 6B, 6C:
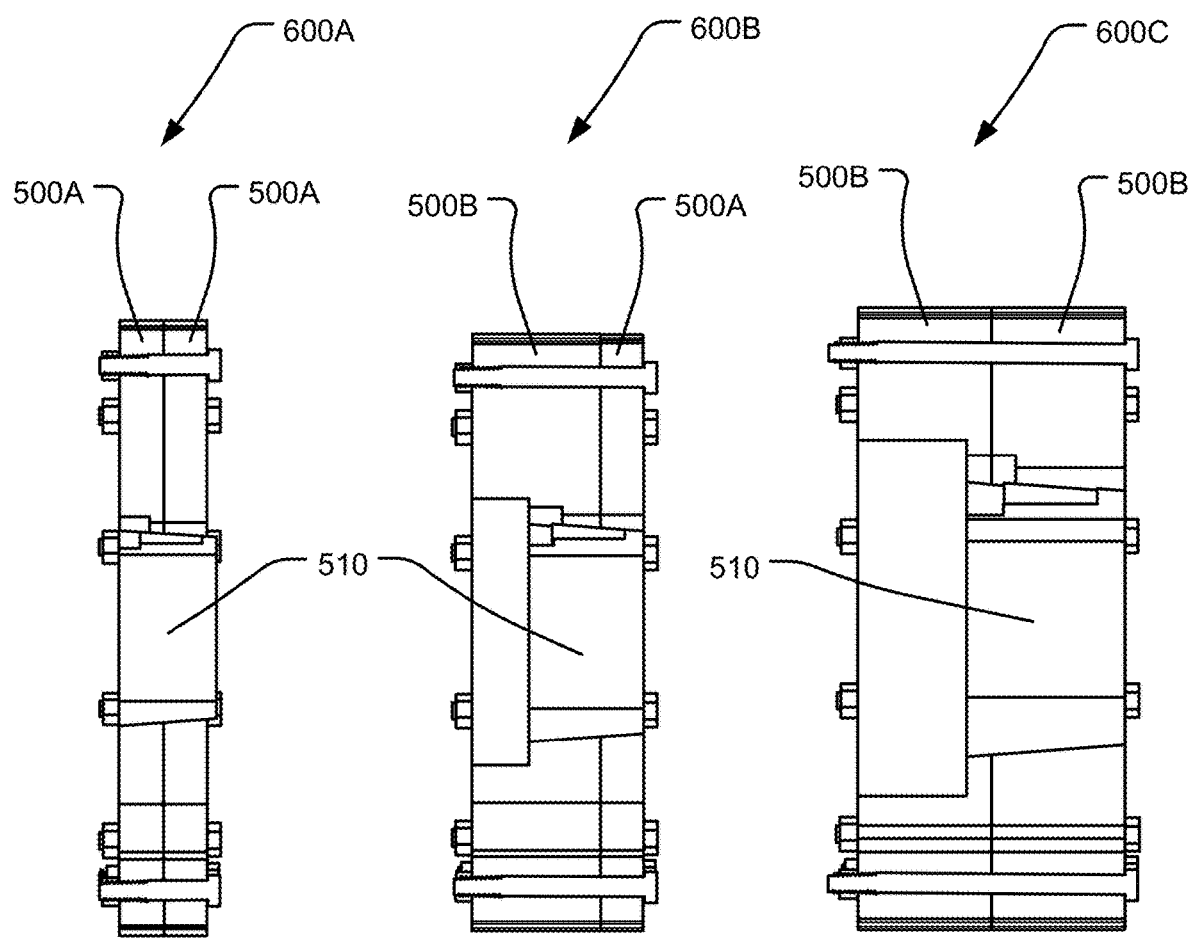
FIGS. 6A-6C are cross-sectional views of various configurations of a hub-less disc sprocket formed from a hub-less disc sprocket system in accordance with various embodiments described herein.

With reference now to FIGS. 5A-6C, another embodiment of a disc sprocket system is illustrated. The disc sprocket system shown in FIGS. 5A-6C generally includes two disc sprockets of differing widths used in various combinations in order to create a hub-less sprocket of varying width. As shown in FIGS. 5A and 5B, the system may generally include a first disc sprocket 500A having a first axial width and a second disc sprocket 500B having a second axial width, the axial width of the second disc sprocket 500B being larger than the axial width of the first disc sprocket 500A. In some embodiments, the disc sprocket system includes two first disc sprockets 500A and two second disc sprockets 500B such that various combinations of these four component pieces can be used to create a hub-less sprocket of varying widths. In some embodiments, the hub-less disc sprocket formed from the disc sprocket system includes only one of the first disc sprockets 500A, such that the hub-less sprocket formed from the disc sprocket system is essentially as shown in FIG. 5A. In some embodiments, the hub-less disc sprocket formed from the disc sprocket system includes only one of the second disc sprockets 500B, such that the hub-less sprocket formed from the disc sprocket system is essentially as shown in FIG. 5B. FIGS. 6A-6C, described in greater detail below, show other configurations using more than one disc sprocket.

Disc sprockets 500A and 500B, while having differing widths, are otherwise generally similarly or identically dimensioned in many respects. For example, the outer diameter of the disc sprocket 500A and disc sprocket 500B may be identical, including having identical tooth profiles (including tooth shape, size, number and arrangement). With identical tooth profiles, the first and second sprockets 500A, 500B can be aligned such that the peaks and valleys of each tooth extend in an axially straight line across the width of the hub-less sprocket.

The inner diameter of each disc sprocket in the hub-less disc sprocket system (i.e., the diameter defining the interior passage extending through the disc sprocket) may vary between individual components, and is generally selected such that the interior passage can receive a bushing therein. Additionally, the inner diameters of one or more disc sprockets combined to form a hub-less sprocket can be machined such that the interior passage is shaped to accommodate a bushing. As shown in FIG. 5A, which may represent a hub-less sprocket formed from one first disc sprocket 500A, the inner diameter tapers inwardly from a first side to a second side such that the interior passage conforms to the shape of a bushing 510 is disposed therein. A similar inwardly tapering inner diameter is used for the second disc sprocket 500B shown in FIG. 5B (which may represent a hub-less sprocket formed from one second disc sprocket 500B), though the interior passage of sprocket 500B also includes a wider inner diameter section at one side of the sprocket 500B such that a bushing can be inserted into the interior passage from the wider inner diameter opening. In the case of the second sprocket 500B shown in FIG. 5B, the interior passage dimensions may initially be similar to the interior passage dimensions shown in FIG. 2, and then interior passage can then be machined to create the desired taper for whatever bushing is to be used with the sprocket.

Referring back to FIG. 5A, in the embodiment where the hub-less sprocket includes only one of the first disc sprockets 500A, the sprocket may further include an interior passage extension segment 520. The interior passage extension segment 520 is designed to ensure that the interior passage of the sprocket is sufficiently long to accommodate a bushing 510 therein. For example, without the interior passage extension segment 520, the bushing 510 would be wider than the axial width of the first disc sprocket 500A, leading to the bushing 510 undesirably extending out of the interior passage when disposed in the interior passage of the disc sprocket 500A. Accordingly, in some embodiments, the axial width of the interior passage extension segment 520 is selected such that the combination of the width of the disc sprocket 500A and the interior passage extension segment 520 is at least as long as the width of the bushing 510 to be disposed therein. The interior passage extension segment 520 is further configured to be coaxially aligned with the disc sprocket 500A and, as shown in FIG. 5A, abuts an axial end of the disc sprocket 500A.

As shown in FIG. 5A, the dimensions of the inner diameter of the interior passage extension segment 520 can be designed or machined such that the interior passage formed from the combination of the interior passage of the interior passage extension segment 520 and the interior passage of the first disc sprocket 500A has an inwardly tapering shape configured to receive a bushing 510 therein.

The specific width of the first disc sprocket 500A and the second disc sprocket 500B is generally not limited, though in some embodiments, the first disc sprocket 500A has a width of about 1 inch and the second disc sprocket 500B has a width of about 3 inches. These dimensions allow for the creation of various standard sprocket widths from various combinations of the first disc sprocket 500A and the second disc sprocket 500B.

With reference now to FIGS. 6A-6C, various combinations of first disc sprockets 500A and second disc sprockets 500B to create a composite sprocket are shown. In FIG. 6A, the sprocket 600A is formed from two first disc sprockets 500A. The two first disc sprockets 500A are coaxially aligned and rotated relative to each other such that the tooth profiles of each disc sprocket 500A are aligned. The interior passage of the sprocket 600A formed from the interior passages of the two first disc sprockets 500A is configured and/or machined to form the desired interior passage shape for receiving a bushing 510 therein. For example, as shown in FIG. 6A, the interior passage of the combined first disc sprockets 500A forms an inwardly tapering shape configured for receiving a bushing 510 therein. In embodiments where the width of each first disc sprocket 500A is about 1 inch, the sprocket formed from two first disc sprockets 500A shown in FIG. 6A has an axial width of about 2 inches.

In FIG. 6B, the sprocket 600B is formed from one first disc sprocket 500A and one second disc sprocket 500B. The first and second disc sprockets 500A, 500B are coaxially aligned and rotated relative to each other such that the tooth profiles of each disc sprocket 500A, 500B are aligned. The interior passage of the sprocket 600B formed from the interior passages of the first and second disc sprockets 500A, 500B is configured and/or machined to form the desired interior passage shape for receiving a bushing 510 therein. For example, as shown in FIG. 6B, the interior passage of the combined first and second disc sprockets 500A, 500B forms an inwardly tapering shape configured for receiving a bushing 510 therein. In embodiments where the width of the first disc sprocket 500A is about 1 inch and the width of the second disc sprocket 500B is about 3 inches, the sprocket formed from first and second disc sprockets 500A, 500B shown in FIG. 6B has an axial width of about 4 inches. While FIG. 6B shows the second disc sprocket 500B at the left side of the composite sprocket 600B and the first disc sprocket 500A at the right side of the composite sprocket 600B, it should be appreciated that the opposite configuration is also possible.

In FIG. 6C, the sprocket 600C is formed from two second disc sprockets 500B. The two second disc sprockets 500B are coaxially aligned and rotated relative to each other such that the tooth profiles of each disc sprocket 500B are aligned. The interior passage of the sprocket 600C formed from the interior passages of the two second disc sprockets 500B is configured and/or machined to form the desired interior passage shape for receiving a bushing 510 therein. For example, as shown in FIG. 6C, the interior passage of the combined second disc sprockets 500B forms an inwardly tapering shape configured for receiving a bushing 510 therein. In embodiments where the width of each second disc sprocket 500B is about 3 inch, the sprocket formed from two second disc sprockets 500B shown in FIG. 6C has an axial width of about 6 inches.

The specific type of bushing 510 used in the above-described embodiments is generally not limited. In some embodiments, including those illustrated in FIGS. 5A-6C, the bushing is a taper lock bushing.

As described in greater detail previously with respect to FIGS. 1-3, the disc sprockets 500A, 500B may include a plurality of fastener passages distributed about the circumference of the sprockets 500A, 500B such that fastener passages in adjacent disc sprockets can be aligned to form fastener passages extending the entire axial width of the sprocket. Once aligned, fasteners 601 (e.g., bolts, screws, etc.) can be inserted into aligned fastener passages to thereby secure together the disc sprockets 500A, 500B.

In some embodiments, the sprocket formed from the disc sprocket system described herein does not include more than two disc sprockets. Thus, FIGS. 5A-6C show the permissible permutations for use of no more than two disc sprockets to form the hub-less sprocket. In such embodiments where no more than two disc sprockets are used to form the sprocket, the composite sprocket would not use, for example, two first disc sprockets 500A and one second disc sprocket 500B, three first disc sprockets 500A, etc.

The disc sprockets 500A, 500B used in the disc sprocket system described herein can generally be manufactured using any know and suitable techniques. Because the disc sprockets 500A, 500B have an axial width generally larger than the axial width used for the disc sprockets 110 described in previous embodiments, the disc sprockets 500A, 500B may be formed from techniques other than stamping. In some embodiments, the disc sprockets 500A, 500B are formed using die cast method for form "blanks" and then using sand casting techniques to form the tooth profiles.

As described previously with respect to the embodiments shown in FIGS. 1-4, the sprockets formed from the disc sprocket system illustrated in FIGS. 5A-6C generally use a hub-less design. In other words, the sprocket formed from various combinations of disc sprockets 500A, 500B is connected or secured to a shaft via a bushing. This is contrast to some sprocket configurations which require the sprocket to be connected or secured to a hub, the hub to be secured or connected to a bushing, and the bushing to be secured or connected to the shaft.

In either of the embodiments shown in FIGS. 1-4 or the embodiments shown in FIGS. 5A-6C, the individual disc sprockets used to construct the overall sprocket are automatically set to the compression state. Use of the compression state for the disc sprockets upon assembling the overall sprocket can be beneficial, as the majority load-induced stress is in the tension state.

From the foregoing, it will be appreciated that specific embodiments of the invention have been described herein for purposes of illustration, but that various modifications may be made without deviating from the scope of the invention. Accordingly, the invention is not limited except as by the appended claims.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended.

Unless otherwise indicated, all number or expressions, such as those expressing dimensions, physical characteristics, etc., used in the specification (other than the claims) are understood as modified in all instances by the term "approximately". At the very least, and not as an attempt to limit the application of the doctrine of equivalents to the claims, each numerical parameter recited in the specification or claims which is modified by the term "approximately" should at least be construed in light of the number of recited significant digits and by applying rounding techniques. Moreover, all ranges disclosed herein are to be understood to encompass and provide support for claims that recite any and all sub-ranges or any and all individual values subsumed therein. For example, a stated range of 1 to 10 should be considered to include and provide support for claims that recite any and all sub-ranges or individual values that are between and/or inclusive of the minimum value of 1 and the maximum value of 10; that is, all sub-ranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

I claim:

1. A multi-disc sprocket, comprising:
   at least two disc sprockets,
   wherein each of the at least two disc sprockets has an identical outer diameter and outer diameter tooth profile, and
   wherein each of the at least two disc sprockets has a plurality of fastener openings spaced about the circumference of the disc sprocket;
   a center flange disc, the center flange disc having a plurality of fastener openings spaced about the circumference of the disc sprocket;
   the center flange disc being positioned between the at least two disc sprockets;
   a plurality of fasteners securing together the at least two disc sprockets and the center flange disc;
   wherein the at least two disc sprockets and the center flange disc are coaxially aligned;
   wherein at least one of the at least two disc sprockets are positioned adjacent to the center flange disc; and
   wherein the fastener openings in each of the at least two disc sprockets and the center flange disc are axially aligned, and one of the plurality of fasteners extends through each set of axially-aligned fastener openings.

* * * * *